United States Patent
Sun et al.

(10) Patent No.: US 7,210,242 B2
(45) Date of Patent: May 1, 2007

(54) DETECTION METHOD OF LIFT GUIDE RAIL PERPENDICULARITY AND A DETECTOR FOR IMPLEMENTING THIS METHOD

(76) Inventors: Lixin Sun, No. 30, Yulong Huayuan Bieshu, Tianshan Nanlu, Dongli District, Tianjin 300162 (CN); Yajuan Sun, No. 30, Yulong Huayuan Bieshu, Tianshan Nanlu, Dongli District, Tianjin 300162 (CN)

( * ) Notice: Subject to any disclaimer, the term of this patent is extended or adjusted under 35 U.S.C. 154(b) by 0 days.

(21) Appl. No.: 10/533,975

(22) PCT Filed: Nov. 6, 2003

(86) PCT No.: PCT/CN03/00936

§ 371 (c)(1),
(2), (4) Date: May 5, 2005

(87) PCT Pub. No.: WO2004/042317

PCT Pub. Date: May 21, 2004

(65) Prior Publication Data

US 2006/0059700 A1     Mar. 23, 2006

(30) Foreign Application Priority Data

Nov. 6, 2002   (CN) ............................... 02 1 49218
Nov. 28, 2002  (CN) ............................... 02 2 88887

(51) Int. Cl.
    *G01B 7/305*   (2006.01)
(52) U.S. Cl. ........................ 33/533; 33/366.24
(58) Field of Classification Search ............... 33/1 N, 33/282, 366.11, 366.24, 533; 187/391, 414; 52/745.2
See application file for complete search history.

(56) References Cited

U.S. PATENT DOCUMENTS

| | | | | |
|---|---|---|---|---|
| 4,345,671 A | * | 8/1982 | Tosato et al. | 52/745.2 |
| 4,593,794 A | * | 6/1986 | Russeau | 52/745.2 |
| 5,119,908 A | * | 6/1992 | Korhonen | 187/408 |
| 5,189,798 A | * | 3/1993 | La Force | 33/533 |
| 5,519,944 A | * | 5/1996 | Delastre | 33/533 |
| 5,553,686 A | * | 9/1996 | Jensen | 187/408 |
| 5,890,564 A | * | 4/1999 | Olsen et al. | 187/250 |
| 6,073,728 A | * | 6/2000 | Olsen et al. | 187/414 |
| 6,195,905 B1 | * | 3/2001 | Cole | 33/533 |
| 6,422,352 B1 | * | 7/2002 | Pettersson et al. | 187/408 |
| 2004/0129503 A1 | * | 7/2004 | Kunz | 187/391 |

* cited by examiner

Primary Examiner—G. Bradley Bennett
(74) Attorney, Agent, or Firm—Bei & Ocean; George G. Wang

(57) ABSTRACT

A detection method for measuring lift guide rail perpendicularity and an apparatus for practicing the method. The detection method includes the following steps: selecting several monitoring points on a working surface of the lift under testing, measuring seriatim the position coordinates of each monitoring point in the longitudinal direction of the guide rail and the distance between two adjacent monitoring points, measuring seriatim the included angle between the line connecting the two adjacent monitoring points and the plumb line (or the horizontal line), plotting a graphic chart of the perpendicularity error data to obtain the perpendicularity curve for the lift guide rail. The apparatus includes an instrument frame, several detector heads, a displacement sensor, an inclination sensor, a microprocessor and a power supply unit installed on the instrument frame. The advantages of the present invention are: the detected data are picked up directly by the sensors and inputted into the microprocessor, and analyzed and outputted by the microprocessor, so that automation and intellectualization of lift guide rail perpendicularity detection are achieved.

15 Claims, 3 Drawing Sheets

DETECTION METHOD OF LIFT GUIDE RAIL PERPENDICULARITY AND A DETECTOR FOR IMPLEMENTING THIS METHOD

FIELD OF THE INVENTION

The invention relates to a detection method and a detector for implementing the method. Particularly, it relates to a detection method for measuring perpendicularity of the guide rail of a lift and an apparatus for practicing the method.

BACKGROUND OF THE INVENTION

The installation quality of the guide rail of a lift, especially the error on perpendicularity, is an important factor affecting the proper operation of the lift. Detection of lift guide rail perpendicularity is a key step to ensure the installation quality of the lift. According to stipulations of GBJ310-88 *Detection and Evaluation Standards for Engineering Quality of Lift Installation*, the error allowance requirement for lift guide rail perpendicularity is 0.7 mm of per 5 m, using the "plumb line and dipstick metering" method. According to Lift Supervision and Detection Regulations issued by General Administration of Quality Supervision, Inspection and Quarantine of the People's Republic of China, 2002-1-9, the maximum error allowance per 5 m of working surface of each guide rail is as follows: 1.2 mm for car guide rails and T counterweight guide rails with safety gears; 2 mm for T counterweight guide rails without safety gears, using laser vertical collimator or magnetic plumb of 5 m in length, measuring along the side and top working surfaces of the guide rail, and detecting sectionally and continuously per 5 m along the vertical line and no less than three sections for each side. The "plumb line and dipstick metering" method has been used to detect guide rail perpendicularity for several decades. Its advantages are using simple measuring and metering tools and obtaining results directly from visual measurements but its shortcomings are inconsistent measuring accuracy among different operators with varying operating skill and visual reading errors, the difficulty for achieving automatic data collection, and low work efficiency.

In recent years, the method with laser vertical collimator is introduced for detecting lift guide rail perpendicularity. For example, the method with JZC-A laser vertical collimator of automatic alignment to detect lift guide rail perpendicularity has been applied for patent by LaTe Laser Technology Development Limited Company of Dalian Development Zone and has been used widely. The method has improved the measuring accuracy and work efficiency over the traditional method of "plumb line and dipstick metering." However, while the pull wire is replaced by the laser beam in the newer method, both methods are basically identical in measuring theory and process. For the newer method, each detection position is still manually measured seriatim and data are still read and collected manually.

SUMMARY OF THE INVENTION

An object of the present invention is to overcome the shortcomings of the existing technologies and to provide a detection method in which the detected data are picked up and outputted by sensors and collected, analyzed and outputted automatically by a microprocessor as well as a detector for practicing this method.

A method for detecting lift guide rail perpendicularity of the present invention comprises the following steps:
1. selecting several monitoring points on the side or top working surface of the lift guide rail under testing;
2. sequentially measuring position coordinates of each monitoring point in the longitudinal direction of the guide rail and the distance between two adjacent monitoring points;
3. sequentially measuring the included angle between the connecting line of two adjacent monitoring points and the plumb line; and
4. calculating, analyzing and transforming the measured data such as position coordinates of each monitoring point in the longitudinal direction of the guide rail, the included angle between the connecting line of two adjacent monitoring points and the plumb line and the distance between two adjacent monitoring points, etc, obtaining error data on guide rail perpendicularity, plotting curve graphic chart of perpendicularity.

In order to practice the above detection method, the present invention further provides a detector for detecting lift guide rail perpendicularity, which is detailed in the following technical description.

The detector comprises an instrument frame, at least two detector heads which can contact with working surface of the guide rail, a displacement sensor used to measure the displacement distance of the detector heads along the guide rail, an inclination sensor used to measure the included angle between the connecting line of the two detector heads and the plumb line, a microprocessor used to process the measured data and a power supply unit installed on the instrument frame; output terminals of the displacement and inclination sensors connect with input terminals of the microprocessor.

The detector heads that can contact with the working surface of the guide rail are of a roller type or slide block type, on which a pressing unit is installed.

The pressing unit is a spring type or magnetic force type.

The displacement sensor may be a rotary encoder that is connected with rollers of detector heads by a flexible coupling.

The displacement sensor may be a photoelectric sensor which will not contact with the working surface of the guide rail and keep a gap of at least 1 mm from the working surface of the guide rail.

The advantages of the present invention are: the detected data are picked up by the sensors and directly inputted into the microprocessor, and analyzed and outputted by the microprocessor, so that automation and intellectualization of perpendicularity detection for lift guide rails are achieved.

EMBODIMENTS OF THE INVENTION

The following is further detailed description of the present invention in conjunction with the embodiments and the drawings.

Figure 1:
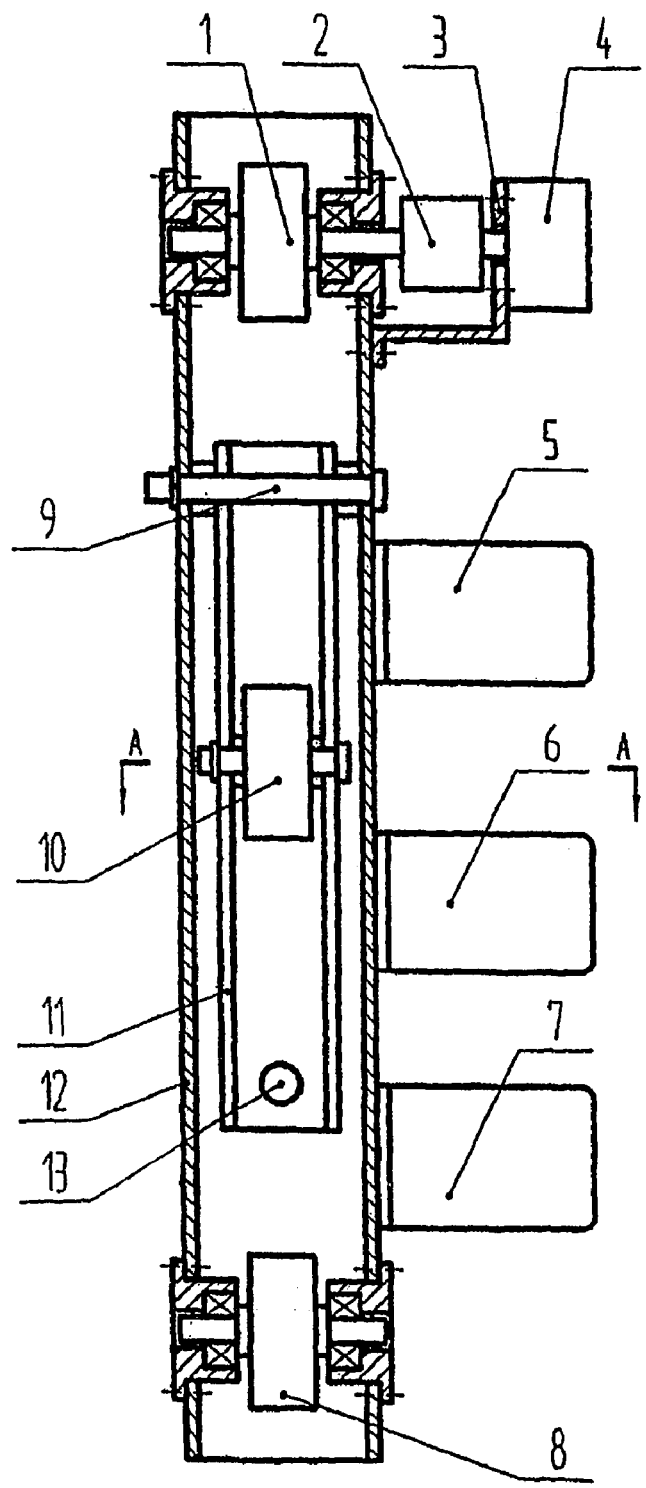
FIG. 1 is a diagram showing the structure of a detector of the present invention.
Figure 3:
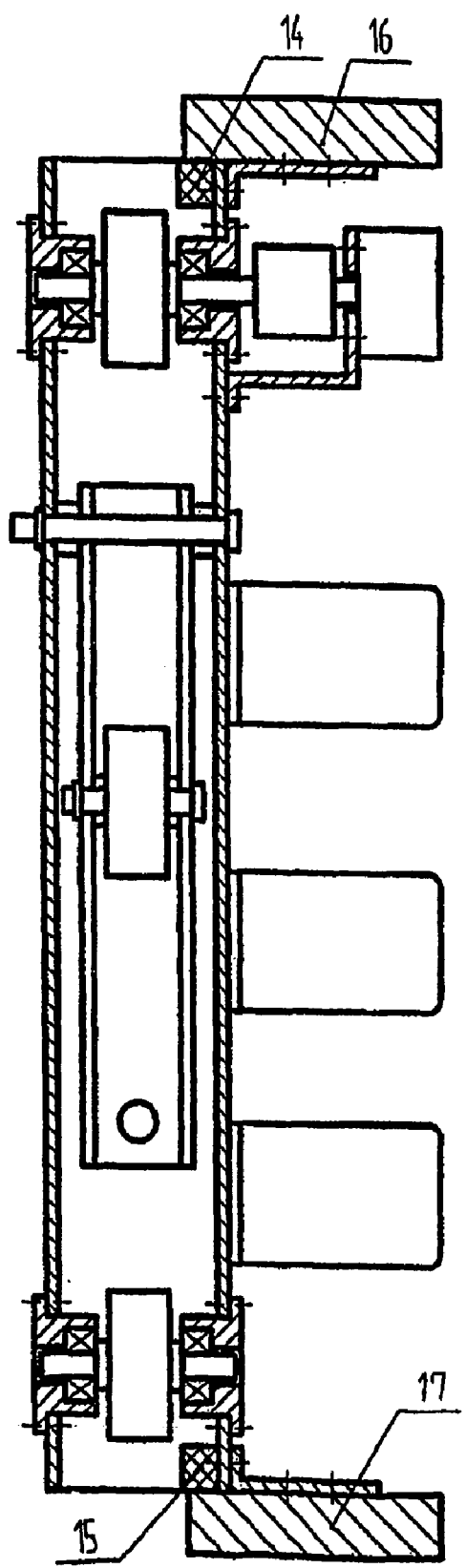
FIG. 3 is a diagram showing the structure of another detector of the present invention.

A method for detecting lift guide rail perpendicularity of the present invention comprises the following steps: selecting several monitoring points on the working surface of the lift to be detected; sequentially measuring position coordinates of each monitoring point in the longitudinal direction of the guide rail and the distance between two adjacent monitoring points; sequentially measuring the included angle between the connecting line of two adjacent monitoring points and the plumb line; obtaining error data of the lift guide rail perpendicularity according to the measured data; plotting curve graphic chart of perpendicularity and so on; the structures of two specific embodiments of the detector for practicing the detection method of lift guide rail perpendicularity of the present invention are shown in FIG. 1 and FIG. 3 respectively; in one structure there are installed with two detector heads 1 and 8, an displacement sensor 4, an inclination sensor 5, a microprocessor 6 and a power supply unit 7 installed on instrument frame 12 (shown in FIG. 1); in the other structure (shown in FIG. 3), besides the elements of the structure shown in FIG. 1, there are two additional detector heads 14 and 15. Detector heads 1, 8, 14 and 15 of the detector may be a roller type or slide block type; the distance between two detector heads can vary from 300 mm to 2000 mm according to measuring requirements; the output terminals of displacement sensor 4 and inclination sensor 5 connect with the input terminals of microprocessor 6.

Embodiment 1

Figure 2:
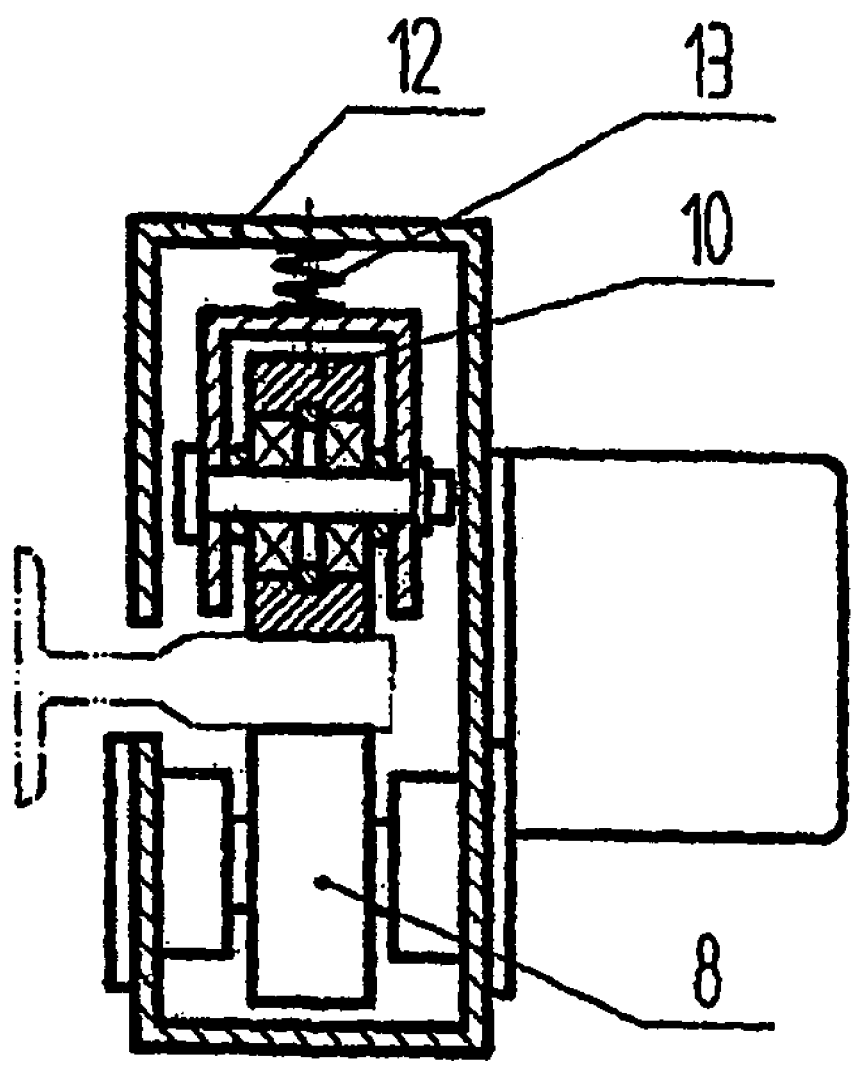
FIG. 2 is a sectional view of the A—A section of the detector in FIG. 1.

The detector of this embodiment is mainly used to detect perpendicularity of the side working surface of a lift guide rail. FIG. 1 illustrates the structure of the detector and FIG. 2 shows that the detector heads are contacted tightly with the side working surface by the action of the contact roller at the A—A section.

In this embodiment, detector heads 1 and 8, installed rigidly on the upper and lower parts of instrument frame 12 respectively, have a roller type structure. For the convenience of measuring and calculation, the predetermined distance between detector head 1 and detector head 8 is 537 mm. In using this detector, detector heads 1and 8 are contacted tightly with one side working surface of the guide rail and pressing roller 10 contacts tightly with the opposite side working surface of the guide rail, then tightening spring 13 applies a pressure of 20–30N on pressing roller 10 by pressed arm 11 to ensure detector heads 1 and 8 to contact with the side working surface of the guide rail at all times. Pressed arm 11 is installed on instrument frame by pin 9.

In this embodiment, displacement sensor 4, with the structure of a rotary encoder connected with the roller of detector head 1 by flexible coupling 2, is used to measure the displacement distance of detector head 1 along the guide rail. When detector head 1 moves along the guide rail, the relative moving direction and distance of the detector to the guide rail are determined by the rolling direction and rotary values of the roller of detector head 1 along the surface of the guide rail, and the rotary values are outputted by way of electric pulse code.

In this embodiment, inclination sensor 5, installed rigidly on instrument frame 12 with the same installation method by which detector head 1 and 8 is installed, measures the included angle between the connecting line of detector heads 1 and 8 and the plumb line. In order to ensure the detecting accuracy, A U.S. made TAB-U inclination sensor of with a resolution of 0.001° (which equals to a perpendicularity resolution of 0.01 mm) is used. In measuring the guide rail perpendicularity, inclination sensor 5 can measure values of the included angle between the plumb line and the line connecting the two monitoring points within each measuring section. Because the distance between detector head 1 and detector 8 is 537 mm, when the detected value of the included angle deviates each 0.1° from the reference, it represents a perpendicularity error of 1 mm.

During the operation, the detector can slide on the guide rail under testing. As the detector is sliding on the guide rail, the measuring data are picked up timely and outputted into microprocessor 6 by displacement sensor 4 and inclination sensor 5, then analyzed and calculated by microprocessor 6, and finally outputted as a curve graphic chart of perpendicularity and the perpendicularity error value at each monitoring point of the guide rail.

Using the detector of this embodiment to practice the detection method of the present invention comprises the following steps:

1. Detector heads 1and 8 of the detector simultaneously contact with the side working surface under testing, position 1 of detector head 1 is referenced as the first monitoring point and position 2 of detector head 8 as the second monitoring point; the known distance between two monitoring points (i.e., the distance between two detector heads) is 573 mm, and the included angle between the connecting line of two monitoring points and the plumb line has been measured by inclination sensor 5; then relative perpendicularity error value of the second monitoring point to the first monitoring point equals to 573×tg α, and the calculation is performed by microprocessor 6.

2. The detector slides along the guide rail under testing, and the values of sliding distance are measured by displacement sensor 4; when the sliding distance is equal to the distance between two detector heads, detector heads 1 and 8 are located in the second and third monitoring points respectively; the included angle between the connecting line of two monitoring points and the plumb line in this measuring section is measured by inclination sensor 5; according to the same theory, the microprocessor carries out the calculation of relative perpendicularity error value of the third monitoring point to the second monitoring point.

3. The detector slides continuously along the guide rail under testing, and the values of the sliding distance are measured by displacement sensor 4; when the sliding distance is equal to the distance between two detector heads, detector heads 1 and 8 are located in the third and, fourth monitoring points respectively; the included angle between the connecting line of two monitoring points and the plumb line in this measuring section is measured by inclination sensor 5; according to the same theory, the microprocessor carries out the calculation of relative perpendicularity error value of the fourth monitoring point to the third monitoring point.

4. Repeat the above process for each measuring section until the detector reaches the end of the guide rail, whereby obtaining a series of the relative perpendicularity error value between two monitoring points within each measuring section.

5. Build a coordinate system where the Y axis represents the length along the guide rail and the X axis represents the value of perpendicularity error; the distance from the beginning to the position of each monitoring point on the guide rail is taken as the y value and the relative perpendicularity error value between two-monitoring points in each measuring section is taken as the x value to plot a curve diagram chart of perpendicularity; the perpendicularity error value at each monitoring point of the guide rail can be obtained from the curve diagram chart; the data are analyzed, calculated and outputted by microprocessor 6.

Embodiment 2

The perpendicularity of the side and top working surfaces can be simultaneously detected by the detector of this embodiment. FIG. 3 illustrates the structure of the detector.

Based on the above description about the operation of embodiment 1 shown in FIG. 1, additional detector heads 14 and 15 are used to detect perpendicularity of top working surface of the guide rail and are installed on the upper and lower parts of instrument frame 12 respectively, outside detector heads 1 and 8. Detector heads 14 and 15 has the structure of a slide block type.

During the operation, the sliding surfaces of detector heads 14 and 15 contact with the top working surface, the detection method of perpendicularity of the top working surface of the guide rail is the same as that of perpendicularity of the side working surface of the guide rail.

In embodiment 2, magnets 16 and 17 are installed on detector heads 14 and 15 respectively to press the sliding surfaces of detector heads 14 and 15 so that they contact tightly with the working surface of the guide rail due to the magnetic attractive force between magnets 16 and 17 and the guide rail.

In both embodiments 1 and 2, displacement sensor 4 is a rotary encoder that is connected with the roller of detector head 1 by flexible coupling 2. Utilizing this mechanical structure of "roller-rotary encoder", during measuring, rotary encoder is used to detect the rolling directions-and rotary values of the roller along the surface of the guide rail and output the electrical pulse code for counting. The rollers contact directly with the guide rail in this way of measuring. Generally, the measuring process is satisfactory. But if lubrication oil coated on the surface of the guide rail causes rollers not to roll due to decreasing in friction, the measuring accuracy may suffer.

For this reason, in another embodiment of the invention, the rotary encoder type displacement sensor 4 is replaced with the photoelectric displacement sensor, which does not come in contact with the working surface of the guide rail, thus avoiding the limitation and effect caused by the conditions on the guide rail. This type sensor works like the optical mouse used with the computer. The gap between the photoelectric displacement sensor and the surface of the guide rail is above 1 mm.

The present invention compared with the existing technologies has the following advantages:

1. Picking up automatically the measured data by sensor, and analyzing and outputting measured data by a microprocessor to achieve automation of the detecting process, reduce operator's labor intensity, and reduce the time of the detecting process.
2. Improving significantly the measuring accuracy, avoiding the effect of operator's personal variations on measuring accuracy.
3. Capable of general purpose applications in measuring guide rails, suitable not only in detecting perpendicularity of lift guide rails, but also in detecting horizontality of guide rails for other heavy mechanical equipment, such as rails of the railway and guide rails for moving cranes, etc.

The foregoing description can be read in conjunction with the specific embodiments and accompanying drawings, is only exemplary of the principles of the present invention and should not be viewed as limitations to the present invention. Thus, the apparatus for practicing the detection method of the invention is not limited in anyway to the described embodiments. Any equivalent variations or modifications to the structure of the described method and apparatus or its relevant application methods are within the scope of the claimed protection.

We claim:

1. A method for detecting a perpendicularity error of a guide rail of a lift, comprising steps of:
   (1) selecting a plurality of monitoring points on a side or top working surface of said lift;
   (2) obtaining a positional coordinate of each said monitoring point in a longitudinal direction of said guide rail and obtaining a distance between two adjacent monitoring points;
   (3) measuring an included angle between a connecting line of said two adjacent monitoring points and a plumb line; and
   (4) obtaining said perpendicularity error of the guide rail of said lift from a calculation performed by a microprocessor.

2. The method of claim 1, wherein said positional coordinate, said distance, and said included angle are sent to said microprocessor.

3. The method of claim 2, wherein said calculation performed by said microprocessor is based at least partially on said positional coordinate, said distance and said included angle.

4. An apparatus for practicing the method of claim 1, comprising:
   (1) a frame;
   (2) at least two detector heads adapted to contact with a working surface of a guide rail of a lift;
   (4) an inclination sensor capable of measuring an included angle between a connecting line of two detector heads and a plumb line; and
   (5) a microprocessor capable of analyzing said displacement distance and said inclination;
   wherein said detector heads, said displacement sensor, said inclination sensor, and said microprocessor are installed either on or in said frame.

5. The apparatus of claim 4, further comprising a power supplier installed on or in said frame.

6. The apparatus of claim 4, wherein each of said displacement sensors and said inclination sensor has at least one output terminal and said microprocessor has at least one input terminal; said output terminal being connected to said input terminal.

7. The apparatus of claim 5, wherein at least one of said detector heads is of a roller type with an excircle surface contacting with said working surface of said guide rail.

8. The apparatus of claim 5, wherein at least one of said detector heads is of a slide block type with a sliding surface contacting with said working surface of said guide rail.

9. The apparatus of claim 5, wherein said detector heads comprising a pressing unit, said pressing unit keeping said detector in contact with said working surface.

10. The apparatus of claim 9, wherein said pressing unit is of a spring type or a magnetic power type.

11. The apparatus of claim 7, wherein said displacement sensor is a rotary encoder.

12. The apparatus of claim 11, wherein said rotary encoder is connected to said detector heads by a flexible coupling.

13. The apparatus of claim 5, wherein at least one of said displacement sensors is a photoelectric sensor.

14. The apparatus of claim 13, wherein said photoelectric sensor does not come in contact with said working surface of said guide rail, leaving a gap between said photoelectric sensor and said working surface.

15. The apparatus of claim 14, wherein said gap is at least 1 mm.

* * * * *